(12) United States Patent
Imanilov et al.

(10) Patent No.: US 11,838,796 B2
(45) Date of Patent: Dec. 5, 2023

(54) COMPRESSION AND DECOMPRESSION BETWEEN ELEMENTS OF A WIRELESS COMMUNICATIONS SYSTEM (WCS)

(71) Applicant: Corning Research & Development Corporation, Corning, NY (US)

(72) Inventors: Benjamin Imanilov, Hod haSharon (IL); Evgenii Pustovalov, Saint-Petersburg (RU)

(73) Assignee: Corning Research & Development Corporation, Corning, NY (US)

( * ) Notice: Subject to any disclaimer, the term of this patent is extended or adjusted under 35 U.S.C. 154(b) by 188 days.

(21) Appl. No.: 17/406,073

(22) Filed: Aug. 18, 2021

(65) Prior Publication Data
US 2023/0055397 A1    Feb. 23, 2023

(51) Int. Cl.
*H04W 28/06* (2009.01)
*H04L 69/04* (2022.01)

(52) U.S. Cl.
CPC ............. *H04W 28/06* (2013.01); *H04L 69/04* (2013.01)

(58) Field of Classification Search
CPC ........ H04W 28/06; H04W 4/18; H04L 69/04; H04L 1/0007; H04L 47/365; H04L 1/0014; H04L 69/32; H04L 67/5651; H04L 69/22; H03M 7/30
See application file for complete search history.

(56) References Cited

U.S. PATENT DOCUMENTS

| | | | |
|---|---|---|---|
| 8,923,386 | B2 | 12/2014 | Samardzija et al. |
| 9,059,778 | B2 | 6/2015 | Ling |
| 9,215,297 | B2 | 12/2015 | Ryan et al. |
| 9,729,215 | B2 | 8/2017 | Rahman et al. |
| 2012/0207206 | A1 | 8/2012 | Samardzija et al. |
| 2012/0250740 | A1* | 10/2012 | Ling .................. H03M 7/30 375/219 |
| 2016/0270080 | A1* | 9/2016 | Zeng ..................... H04L 5/06 |
| 2017/0093611 | A1* | 3/2017 | Arora ............... H04L 12/4633 |
| 2018/0041327 | A1* | 2/2018 | Wolff ............... H04L 27/2634 |

(Continued)

FOREIGN PATENT DOCUMENTS

| | | |
|---|---|---|
| EP | 3494757 A1 | 6/2019 |
| WO | 2018/024940 A1 | 2/2018 |

OTHER PUBLICATIONS

K. F. Nieman, et al., "Time-domain compression of complex-baseband LTE signals for cloud radio access networks", Proc. IEEE Global Conf. on Signal and Info. Processing, Dec. 2013, pp. 1198-1201.

(Continued)

*Primary Examiner* — Ian N Moore
*Assistant Examiner* — Latresa A McCallum
(74) *Attorney, Agent, or Firm* — William D. Doyle

(57) ABSTRACT

Systems and methods for compression and decompression between elements of a wireless communications system (WCS) such as a distributed antenna system (DAS) contemplate performing a fast Fourier transform (FFT) operation before compression and transmission across a transport medium in a DAS. Further, a size of an FFT block may be varied based on latency requirements. For example, the FFT block size may be based on a sampling rate extracted from channel information. By selecting the FFT block size to meet latency requirements, overall throughput across the transport medium may be increased.

20 Claims, 14 Drawing Sheets

(56) References Cited

U.S. PATENT DOCUMENTS

| | | | |
|---|---|---|---|
| 2018/0115348 A1* | 4/2018 | Li | H04B 7/0413 |
| 2018/0359123 A1* | 12/2018 | Kimura | H04L 27/26 |
| 2019/0123834 A1* | 4/2019 | Zarubinsky | H04L 25/03159 |
| 2019/0335379 A1* | 10/2019 | Joseph | H04W 40/246 |
| 2019/0342771 A1* | 11/2019 | Zhu | H04L 1/0014 |
| 2020/0182959 A1* | 6/2020 | Markhovsky | G01S 5/12 |
| 2020/0260524 A1* | 8/2020 | Kim | H04W 80/08 |

OTHER PUBLICATIONS

O-RAN.WG4.CUS.0-v03.00; O-RAN Fronthaul Working Group; Control, User and Synchronization Plane Specification, Technical Specification; Annex A. Compression methods, 2021, pp. 181-191.

* cited by examiner

| CHANNEL BANDWIDTH [MHZ] | SAMPLING RATE [MHz] | FFT BLOCK SIZE | | | | | | | |
|---|---|---|---|---|---|---|---|---|---|
| | | 16 | 32 | 64 | 128 | 256 | 512 | 1024 | 2048 | 4096 |
| | | LATENCY [US] | | | | | | | | |
| 5 | 7.68 | 4.17 | 8.34 | 16.67 | 33.34 | 66.67 | 133.33 | 266.67 | 533.34 | 1066.67 |
| 10 | 15.36 | 2.08 | 4.17 | 8.34 | 16.67 | 33.34 | 66.67 | 133.33 | 266.67 | 533.34 |
| 15 | 30.72 | 1.04 | 2.08 | 4.17 | 8.34 | 16.67 | 33.34 | 66.67 | 133.33 | 266.67 |
| 20 | 30.72 | 1.04 | 2.08 | 4.17 | 8.34 | 16.67 | 33.34 | 66.67 | 133.33 | 266.67 |
| 25 | 30.72 | 1.04 | 2.08 | 4.17 | 8.34 | 16.67 | 33.34 | 66.67 | 133.33 | 266.67 |
| 30 | 61.44 | 0.52 | 1.04 | 2.08 | 4.17 | 8.34 | 16.67 | 33.34 | 66.67 | 133.33 |
| 40 | 61.44 | 0.52 | 1.04 | 2.08 | 4.17 | 8.34 | 16.67 | 33.34 | 66.67 | 133.33 |
| 50 | 61.44 | 0.52 | 1.04 | 2.08 | 4.17 | 8.34 | 16.67 | 33.34 | 66.67 | 133.33 |
| 60 | 122.88 | 0.26 | 0.52 | 1.04 | 2.08 | 4.17 | 8.34 | 16.67 | 33.34 | 66.67 |
| 70 | 122.88 | 0.26 | 0.52 | 1.04 | 2.08 | 4.17 | 8.34 | 16.67 | 33.34 | 66.67 |
| 80 | 122.88 | 0.26 | 0.52 | 1.04 | 2.08 | 4.17 | 8.34 | 16.67 | 33.34 | 66.67 |
| 90 | 122.88 | 0.26 | 0.52 | 1.04 | 2.08 | 4.17 | 8.34 | 16.67 | 33.34 | 66.67 |
| 100 | 122.88 | 0.26 | 0.52 | 1.04 | 2.08 | 4.17 | 8.34 | 16.67 | 33.34 | 66.67 |
| 200 | 245.76 | 0.13 | 0.26 | 0.52 | 1.04 | 2.08 | 4.17 | 8.34 | 16.67 | 33.34 |
| 400 | 491.52 | 0.065 | 0.13 | 0.26 | 0.52 | 1.04 | 2.08 | 4.17 | 8.34 | 16.67 |

FIG. 8

COMPRESSION AND DECOMPRESSION BETWEEN ELEMENTS OF A WIRELESS COMMUNICATIONS SYSTEM (WCS)

BACKGROUND

The disclosure relates generally to controlling how remote units and head end units within a wireless communications system (WCS), such as a distributed antenna system (DAS), communicate effectively with one another and particularly relates to compression and decompression techniques used in communication between the remote units and head end units.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Various communications systems have been provided to transmit and/or distribute communications signals to wireless devices called "clients," "client devices," "user equipment," or "wireless client devices," which must reside within the wireless range or "cell coverage area" to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a DAS involves the use of radio nodes/base stations that transmit communications signals distributed over physical communications media to remote units forming distributed radio frequency (RF) antenna coverage areas, also referred to as "antenna coverage areas."

Within a DAS, it is not uncommon for a head end unit (also sometimes referred to as a central unit) to communicate with a remote unit using a protocol such as the common public radio interface (CPRI). Further, it is not uncommon for signals from multiple vendors, constructed from multiple channels for multiple antennas to be sent at the same time over the same transport medium between a given head end unit and a given remote unit. As such signals increase, the general requirement for an overall high data rate requires a high-capacity transport medium, which increases the cost of network deployment. Compression is commonly used to increase the effective capacity of a transport medium. So-called lossless compression methods (e.g., Huffman codes) may compress a signal without quality degradation, but at the expense of increased latency, typically at levels that are greater than system requirements. Lossy compression techniques such as mu-law quantization, block floating point, resampling, vector quantization, and the like work well in some instances, but may not always perform for signal scenario cases of multiple users with different power levels in the same channel. Accordingly, there remains room for improved compression and decompression techniques for use in a DAS.

No admission is made that any reference cited herein constitutes prior art. Applicant expressly reserves the right to challenge the accuracy and pertinency of any cited documents.

SUMMARY

Aspects disclosed herein include systems and methods for compression and decompression between elements of a wireless communications system (WCS) such as a distributed antenna system (DAS). In particular, exemplary aspects of the present disclosure contemplate performing a fast Fourier transform (FFT) operation before compression and transmission across a transport medium in a DAS. Further, a size of an FFT block may be varied based on latency requirements. For example, the FFT block size may be based on a sampling rate extracted from channel information. By selecting the FFT block size to meet latency requirements, overall throughput across the transport medium may be increased.

One exemplary embodiment of the disclosure relates to a device. The device comprises an input configured to receive a signal from a remote source. The device also comprises a compression unit coupled to the input. The compression unit comprises a size calculator unit configured to evaluate channel requirements to determine an FFT block size. The compression unit also comprises a variable-sized FFT unit coupled to the size calculator unit. The variable-sized FFT unit is configured to receive digital samples based on the signal and perform an FFT operation thereon to produce a transformed signal. The compression unit also comprises a transformed signal compression unit coupled to the variable-sized FFT unit. The transformed signal compression unit is configured to apply a compression algorithm on the transformed signal to produce a compressed signal. The device also comprises a fronthaul interface coupled to the compression unit. The fronthaul interface is configured to receive the compressed signal, couple to a transport medium, and send the compressed signal over the transport medium.

Another exemplary embodiment of the disclosure relates to a WCS. The WCS comprises a head end unit. The WCS also comprises a plurality of remote units each coupled to the head end unit via a transport medium. The head end unit comprises a compression unit. The compression unit comprises a size calculator unit configured to evaluate channel requirements to determine an FFT block size. The compression unit also comprises a variable-sized FFT unit coupled to the size calculator unit. The variable-sized FFT unit is configured to perform an FFT operation on digital samples to produce a transformed signal. The compression unit also comprises a transformed signal compression unit coupled to the variable-sized FFT unit. The transformed signal compression unit is configured to apply a compression algorithm on the transformed signal to produce a compressed signal. The compression unit also comprises a fronthaul interface coupled to the compression unit. The fronthaul interface is configured to receive the compressed signal, couple to the transport medium, and send the compressed signal over the transport medium.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8 provides a table showing how variable-sized FFT units impact latency based on channel bandwidth;

DETAILED DESCRIPTION

Aspects disclosed herein include systems and methods for compression and decompression between elements of a wireless communication system (WCS) such as a distributed antenna system (DAS). In particular, exemplary aspects of the present disclosure contemplate performing a fast Fourier transform (FFT) operation before compression and transmission across a transport medium in a DAS. Further, a size of an FFT block may be varied based on latency requirements. For example, the FFT block size may be based on a sampling rate extracted from channel information. By selecting the FFT block size to meet latency requirements, overall throughput across the transport medium may be increased.

Figure 1A:
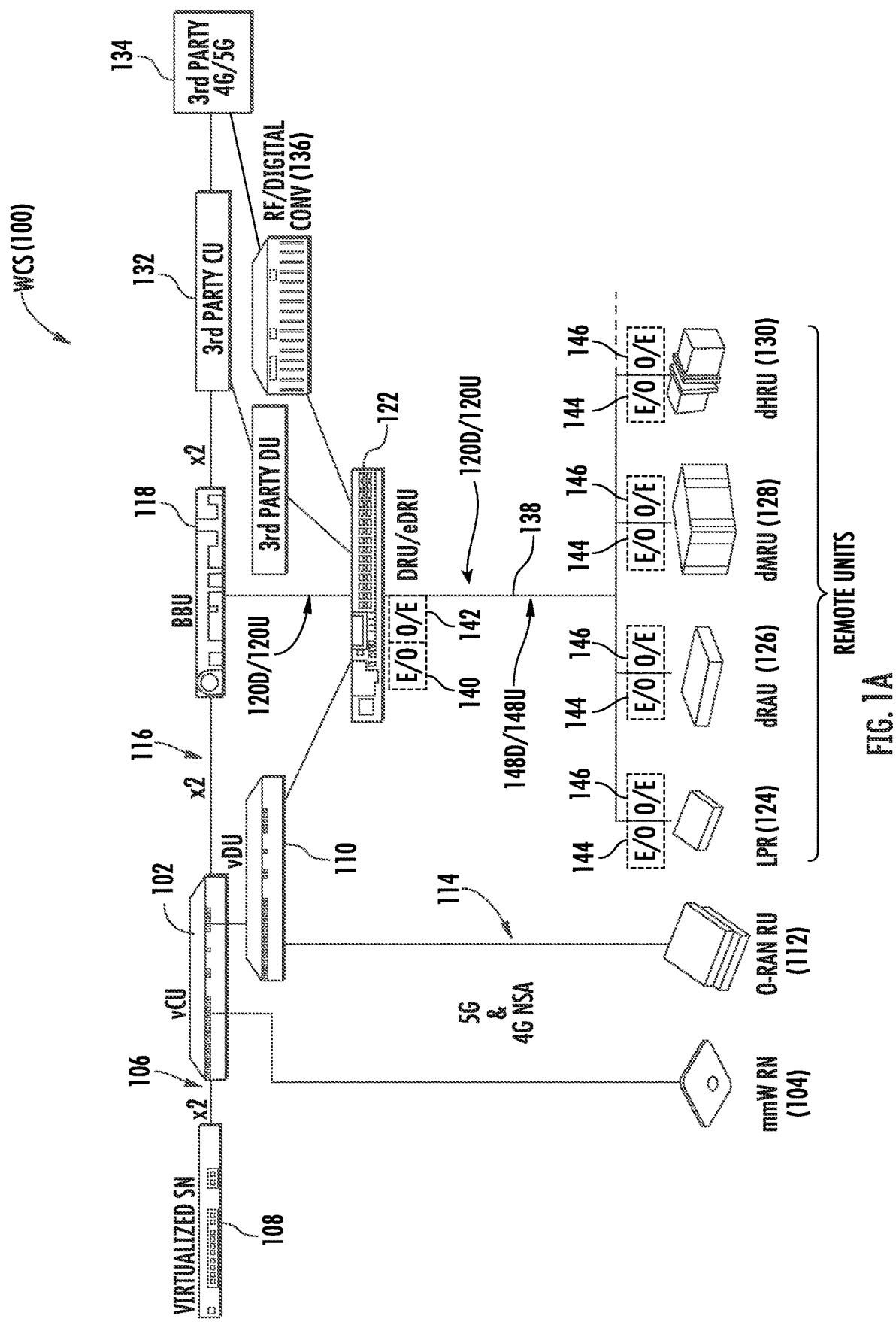
FIG. 1A is a schematic diagram of an exemplary wireless communications system (WCS) configured according to any of the embodiments disclosed herein for efficient compression and decompression.
Figure 1B:
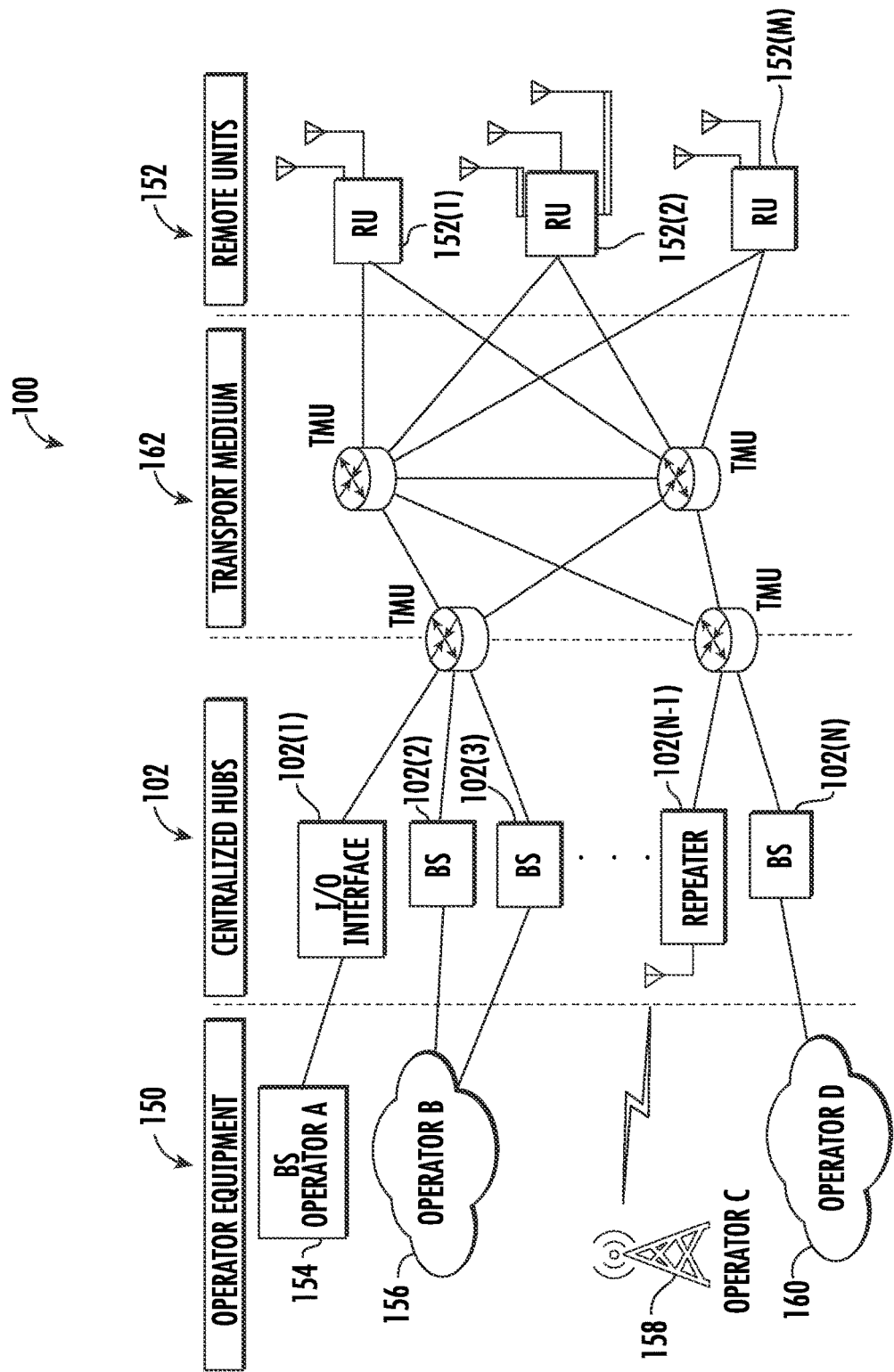
FIG. 1B is a block diagram of the WCS of FIG. 1A highlighting the relative positions of central units relative to remote units with a transport medium therebetween.
Figure 1C:
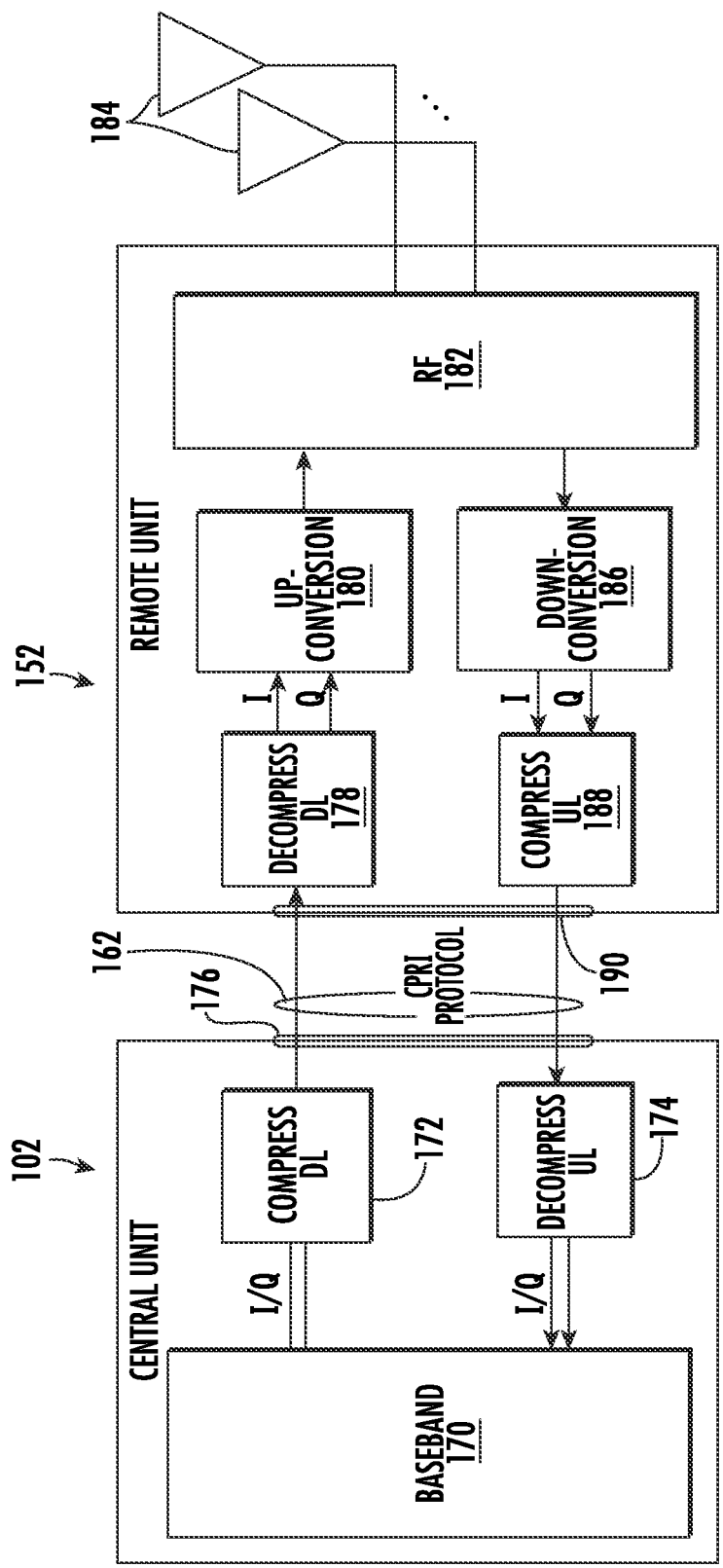
FIG. 1C is a block diagram of a single central unit and a single remote unit from the WCS of FIG. 1B coupled by a transport medium.
Figure 2:
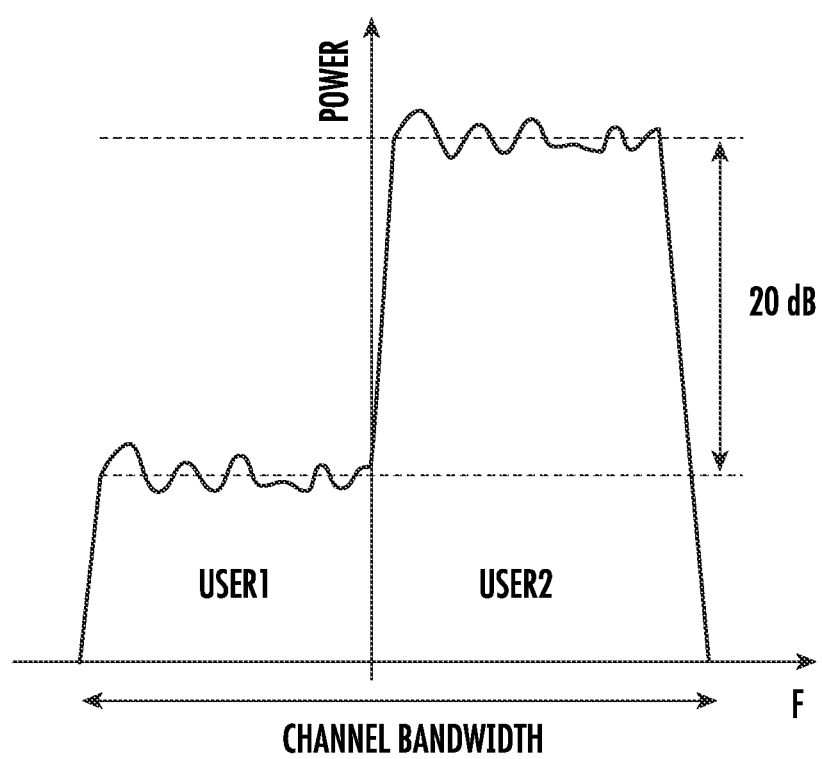
FIG. 2 illustrates a power versus bandwidth graph of two users with different power levels that are poorly served by existing compression schemes.

An overview of a WCS that may include a distributed antenna system (DAS) is provided with reference to FIGS. 1A and 1B to give context for the exemplary aspects of the present disclosure. FIG. 1C provides additional details about compression systems within elements of the WCS of FIGS. 1A and 1B. FIG. 2 provides a graphical depiction of users having different power levels, which may make existing compression systems sub-optimal. A discussion of a compression and decompression system using variable-size FFT units begins below with reference to FIG. 3.

In this regard, FIG. 1A is a schematic diagram of an exemplary WCS 100 configured according to any of the aspects disclosed herein to support dynamic compression and decompression for signals to and from remote units. The WCS 100 supports both legacy 4G long term evolution (LTE), 4G/5G non-standalone (NSA), and 5G standalone communications systems. As shown in FIG. 1A, a centralized services node 102 is provided that is configured to interface with a core network to exchange communications data and distribute the communications data as radio signals to remote units. In this example, the centralized services node 102 (also referred to as vCU in FIG. 1A) is configured to support distributed communications services to a millimeter wave (mmWave) radio node (mmW RN) 104. Despite that only one mmWave radio node 104 is shown in FIG. 1A, it should be appreciated that the WCS 100 can be configured to include additional numbers of the mmWave radio node 104, as needed. The functions of the centralized services node 102 can be virtualized through an x2 interface 106 to another services node 108. The centralized services node 102 can also include one or more internal radio nodes that are configured to be interfaced with a distribution unit (DU) or distribution node 110 to distribute communications signals for the radio nodes to an open radio access network (RAN) (O-RAN) remote unit 112 that is configured to be communicatively coupled through an O-RAN interface 114.

The centralized services node 102 can also be interfaced through an x2 interface 116 to a digital baseband unit (BBU) 118 that can provide a digital signal source to the centralized services node 102. The digital BBU 118 is configured to provide a signal source to the centralized services node 102 to provide downlink communications signals 120D to the O-RAN remote unit 112 as well as to a DRU 122 as part of a digital DAS. The DRU 122 is configured to split and distribute the downlink communications signals 120D to different types of remote units, including a low-power remote unit (LPR) 124, a radio antenna unit (dRAU) 126, a mid-power remote unit (dMRU) 128, and a high-power remote unit (dHRU) 130. The DRU 122 is also configured to combine uplink communications signals 120U received from the LPR 124, the dRAU 126, the dMRU 128, and the dHRU 130 and provide the combined uplink communications signals 120U to the digital BBU 118. The digital BBU 118 is also configured to interface with a third-party central unit 132 and/or an analog source 134 through a radio frequency (RF)/digital converter 136.

The DRU 122 may be coupled to the LPR 124, the dRAU 126, the dMRU 128, and the dHRU 130 via an optical fiber-based communications medium 138. In this regard, the DRU 122 can include a respective electrical-to-optical (E/O) converter 140 and a respective optical-to-electrical (O/E) converter 142. Likewise, each of the LPR 124, the dRAU 126, the dMRU 128, and the dHRU 130 can include a respective E/O converter 144 and a respective O/E converter 146.

The E/O converter 140 at the DRU 122 is configured to convert the downlink communications signals 120D into downlink optical communications signals 148D for distribution to the LPR 124, the dRAU 126, the dMRU 128, and the dHRU 130 via the optical fiber-based communications medium 138. The O/E converter 146 at each of the LPR 124, the dRAU 126, the dMRU 128, and the dHRU 130 is configured to convert the downlink optical communications signals 148D back to the downlink communications signals 120D. The E/O converter 144 at each of the LPR 124, the dRAU 126, the dMRU 128, and the dHRU 130 is configured to convert the uplink communications signals 120U into uplink optical communications signals 148U. The O/E converter 142 at the DRU 122 is configured to convert the uplink optical communications signals 148U back to the uplink communications signals 120U.

It should be appreciated that the downlink optical communications signals 148D and the uplink optical communication signals 148U may use a transport standard known as common public radio interface (CPRI). CPRI defines a protocol for providing connectivity, synchronization and control communications between baseband units and remote radio units.

FIG. 1B provides an alternate representation of the WCS 100 where the centralized service nodes 102, also referred to as centralized hubs or head end units may communicate with operator equipment 150 and remote units 152(1)-152(M), generically remote unit 152. The operator equipment 150 may include a base station operator A 154, an operator B 156, an operator C 158, and an operator D 160. The various operator equipment 150 may communicate with different ones of the centralized service nodes 102(1)-102(N). The remote units 152(1)-152(M) communicate with the centralized service nodes 102(1)-102(N) through a transport or transport medium 162, which may, in an exemplary aspect, be an optical fiber or the like.

FIG. 1C provides a simpler view of a single centralized service node 102, also called a "central unit 102," coupled to a single remote unit 152 through a transport medium 162. In an exemplary aspect, the central unit 102 includes a baseband processor 170, a compression unit 172, and a decompression unit 174. The central unit 102 includes an interface 176 configured to be coupled to the transport medium 162.

With continued reference to FIG. 1C, the remote unit 152 may include a decompression unit 178, an up-conversion circuit 180, a radio frequency transceiver 182, one or more antennas 184, a down-conversion circuit 186, and a compression unit 188. The remote unit 152 may further include an interface 190 configured to be coupled to the transport medium 162. For the sake of clarity, the downlink is considered to be communication from the central unit 102 to the remote unit 152, and the uplink is considered to be communication from the remote unit 152 to the central unit 102.

In general, any number of compression algorithms may be used by compression unit 172 or 188. A compression can be characterized by a variety of parameters, including compression ratio, processing latency for compression and decompression, signal quality degradation, and implementation complexity including memory requirements. Lossless compression methods (e.g., Huffman codes) can compress a signal without quality degradation, but generally introduce high latency that is not acceptable in most WCSs. Lossy compression methods may find acceptable tradeoffs between compression ratio, processing latency for compression and decompression, and signal quality degradation of time-domain digital samples, particularly for spectrum flat channels (i.e., all users have approximately the same power levels within a channel). However, there may be situations where power levels between different users that are being concurrently sent across the transport medium 162 are dramatically different. In 4G, this scenario is mostly related to an uplink channel (i.e., from remote unit to central unit).

5G introduced a Bandwidth Parts (BWP) technique where a channel referred to as a carrier can be divided into several BWPs to support reduced bandwidth capabilities of user equipment. According to 3GPP requirements, a power level difference between BWPs of up to twenty decibels (20 dB) should be supported as generally shown in FIG. 2. Specifically, FIG. 2 shows two users with dramatically different power levels sharing a channel.

Where 4G and 5G channels coexist dynamically, dynamic spectrum sharing (DSS) may be used within a CPRI channel, with the net result for DAS being that several operators' signals exist in the same CPRI channel, with commensurate differing power levels potentially. When the combined signal (summed from signals from multiple users at differing power levels) is received in the time-domain, signal processing methods will be adjusted to the sum of the signals. Because the sum is dominated by the high-power signal, the signal sampling quality of the lower-power users will be more impacted before compression and could degrade significantly with compression.

Most conventional compression solutions do not explicitly address the disparate impact on lower-power users. In systems using a frequency domain fronthaul, some compression methods may implicitly solve this problem. For example, an orthogonal frequency-division multiplexing (OFDM) system used in 4G and 5G may convert frequency domain symbols to time domain samples by an inverse FFT (IFFT) operation and extension by a cyclic prefix (CP) at the transmitter. At the receiver side, first the CP is removed from the time domain samples followed by conversion to frequency domain symbols at the receiver. Enhanced CPRI (eCPRI) has been proposed which contemplates organizing compression of bandwidth parts of high-power users separately from bandwidth parts of lower-power users. While the compression ratio-to-quality tradeoff is expected to be better than the original CPRI, where no information regarding a signal is available, a blind detection and demodulation of an OFDM signal is required on the compression side followed by signal reconstruction and modulation on the decompression side (to ensure transparency for devices with time domain samples interfaces). This approach introduces additional latency, which may exceed system tolerances.

Exemplary aspects of the present disclosure apply an FFT operation before general-purpose compression. Further, the size of the FFT block is not fixed and is not matched to the size of the FFT block used in OFDM signal generation. Instead, the size of the FFT block is calculated based on latency requirements. Still further, there is no need to detect and/or remove a cyclic prefix. Flexible control of the FFT block allows balancing between performance and latency.

Figure 3:
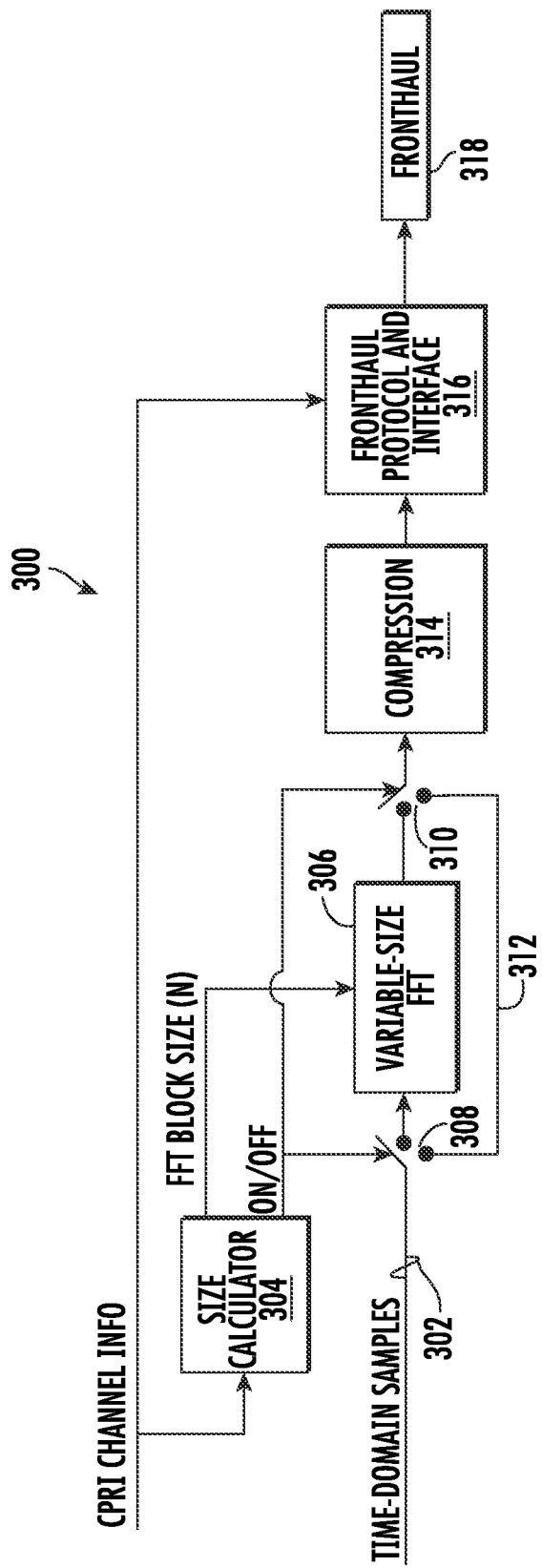
FIG. 3 is a block diagram of a compression module with a variable-size fast Fourier transform (FFT) unit used before compression according to an exemplary aspect of the present disclosure.

In this regard, FIG. 3 illustrates a compression unit 300 that may be within a device such as a central unit 102 or a remote unit 152 and is analogous to the compression units 172 and 188 of FIG. 1C. The device may include an input configured to receive a signal from a remote source. For example, if the device is a central unit 102, the input may be the interface that is configured to receive a signal from an operator through, for example, a base station or the like. If the device is a remote unit 152, the input may be the antenna 184 configured to receive a signal from user equipment. The compression unit 300 may be coupled (indirectly) to the input and receive time-domain samples 302 therefrom. The time-domain samples 302 may be a radio frequency signal version of the signal received from the remote source. The compression unit 300 may further receive channel information, such as, for example, CPRI channel information.

With continued reference to FIG. 3, a size calculator unit 304 may evaluate channel requirements to determine a FFT block size. The block size information is provided to a variable-sized FFT unit 306. A first switch 308 selectively provides the time-domain samples 302 to the FFT unit 306. The first switch 308 and a second switch 310 are controlled by the size calculator unit 304. Specifically, the size calculator unit 304 controls the switches 308 and 310 to provide the time-domain samples 302 to the variable-sized FFT unit 306 or to route the time-domain samples 302 through a bypass route 312. If the time-domain samples 302 are provided to the variable-sized FFT unit 306, the variable-sized FFT unit 306 performs an FFT operation thereon to produce a transformed signal. Either the time-domain samples 302 or the transformed signal is provided to a transformed signal compression unit 314 (with the understanding that the transformed signal compression unit 314 could operate on the original time domain samples 302 if the bypass route 312 is used). The transformed signal compression unit 314 applies a general-purpose compression algorithm (e.g., quantization, block scaling, block floating point, resampling, or the like). Once compressed, a fronthaul protocol and interface 316 (sometimes referred to as just a fronthaul interface and analogous to the interface 176 of FIG. 1C), receives the compressed signal and applies, for example, a CPRI protocol to the compressed signal. The fronthaul interface 316 is coupled to a transport medium 318 and sends the compressed signal over the transport medium 318 (analogous to the transport medium 162 of FIG. 1C). Note that the transport medium 318 may also be referred to as a fronthaul network. In exemplary aspects, the elements of the compression unit 300 may be implemented in hardware, software, or some blended combination thereof.

Figure 4:
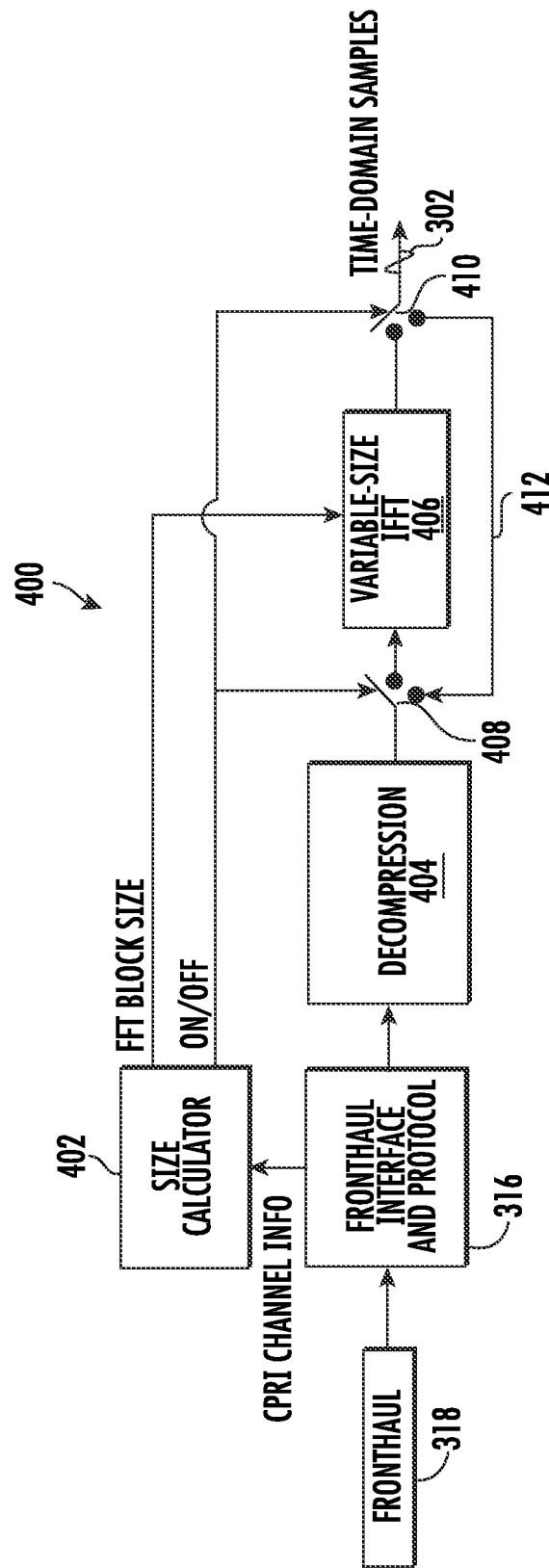
FIG. 4 is a block diagram of a decompression module with a variable-size inverse FFT (IFFT) module used after decompression according to an exemplary aspect of the present disclosure.

FIG. 4 shows a complementary decompression unit 400. The decompression unit 400 may be within a device such as a central unit 102 or a remote unit 152 and is analogous to the decompression units 174 and 178 of FIG. 1C. As noted above, the device may include a fronthaul interface 316 that is coupled to the transport medium 318. Note that it is possible that there may be two fronthaul interfaces (one for uplink and one for downlink) without departing from the present disclosure. The fronthaul interface 316 receives the signal sent over the transport medium 318. The fronthaul interface 316 extracts channel information, such as, for example, CPRI channel information. The extracted channel information is provided to a decompression block size calculator unit 402. The fronthaul interface 316 further extracts the compressed signal from the fronthaul interface (e.g., removing the CPRI formatting from the signal) and provides the compressed signal to a received signal compression unit 404, which reverses the compression algorithm applied by the transformed signal compression unit 314 to produce a decompressed signal.

The decompression block size calculator unit 402 may evaluate the channel information to determine the FFT block size used by the variable-sized FFT unit 306 for a given signal. The block size information is provided to a variable-sized IFFT unit 406. A first switch 408 selectively provides the decompressed signal to the IFFT unit 406. The first switch 408 and a second switch 410 are controlled by the decompression block size calculator unit 402. Specifically, the decompression block size calculator unit 402 controls the switches 408 and 410 to provide the decompressed signal to the variable-sized IFFT unit 406 or to route the decompressed signal through a bypass route 412. If the decompressed signal is provided to the variable-sized IFFT unit 406, the variable-sized IFFT unit 406 performs an IFFT operation thereon to reproduce the time-domain sampled signals 302. The time-domain sampled signals 302 may then be manipulated for output to an operator or through the antenna to user equipment or the like.

In the interests of assisting the interested reader, operation of the FFT unit 306 and the associated size calculator unit 304 is provided with additional mathematical rigor. It should be appreciated that the time-domain samples have a sampling rate of Fs and this value is present in the channel information. The block size (N) may be calculated based on the sample rate extracted from the channel information. The block size N should be the maximal integer that satisfies the latency requirement and any other restrictions related to FFT implementation. Thus, for example $$N/Fs+\Delta(N)<=\text{latency}, \qquad \text{EQ. 1}$$

where $\Delta(N)$ is implementation specific time of the N-size FFT calculation.

The variable-sized FFT unit 306 (and the IFFT unit 406) may thus have a fixed size of N_max, where $\Delta(N)=\Delta(N\_max)=\Delta=\text{const}$ and N_max=N*K, where K is some integer. By way of further example, for the radix-2 FFT implementation, the FFT block size is calculated as:

$$N=\min(2\hat{}(\text{floor}(\log 2((\text{latency}/2-\Delta)*Fs),N\_max) \qquad \text{EQ. 2}$$

where floor( )— lower integer of the continuous value.

Note that if the FFT block size is lower than a minimal value, (e.g., N_min=16), it may be inefficient to use the FFT operation. Accordingly, the size calculator unit 304 triggers the switches 308 and 310 to activate the bypass path 312. When the bypass path 312 is inactive (i.e., the FFT block size is greater than N_min), the FFT unit 306 works in blocks. That is, the FFT unit 306 takes N samples and outputs N samples, where N is calculated as specified above. The block size is sent with the channel information for extraction at the decompression unit 400. It should be appreciated that the IFFT unit 406 operates similarly with the size of the block and the use of the bypass calculated identically.

While the above discussion focuses on a single channel, it is possible that the system may support multiple channels from multiple sources or operators, each with a different bandwidth and/or different sampling frequency. For example, Carrier Aggregation is based on transmitting multiple separate channels, called Carrier Components, that should be emitted by a remote unit 152 over the air simultaneously. Also, non-standalone (NSA) 5G/4G networks may assume simultaneous emitting of 4G and 5G channels. For both cases (carrier aggregation and non-standalone), the channels that are expected to be synchronized in time can have different bandwidths and different sampling rates. If differently-sized FFTs are applied in such a situation, different latencies may be generated, which is not acceptable by definition within the 3GPP standard. Thus, the common latency of channels may be defined by the channel with the largest latency (i.e., the channel with the lowest sampling frequency).

Figure 5:
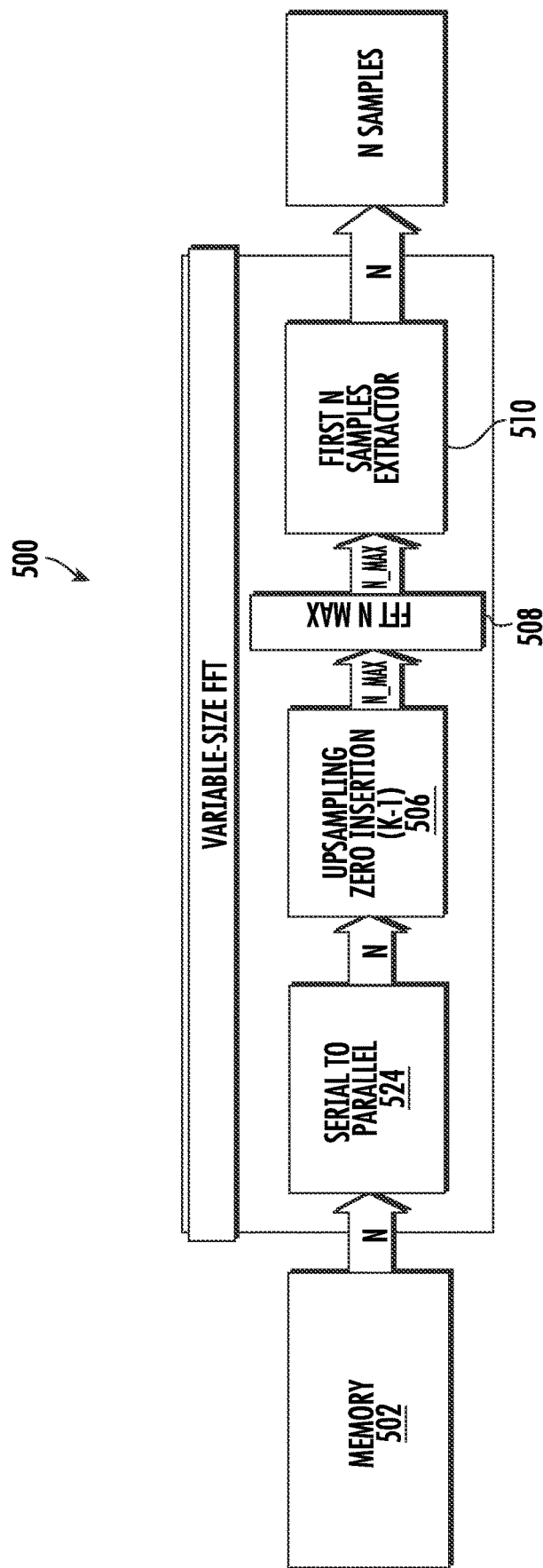
FIG. 5 is a block diagram of a the FFT unit of FIG. 3 with additional interior details provided.

A compression approach which requires implementation of differently-sized FFTs may not be convenient and may be resource intensive. One way of avoiding multiple FFTs is to time share a single FFT through a scheduler. By way of initial explanation, FIG. 5 illustrates use of a single variably-sized FFT unit 500 for a single channel. The N samples are initially buffered in memory 502. This buffering may be a primary contribution to latency. The samples are then provided to a serial-to-parallel converter 504. If N<N_max, i.e., N_max/N=K, an upsampling unit 506 may insert K−1 zeros between each sample to get an N_max upsampled vector. The N_max size FFT or IFFT operation 508 is performed (depending on if this is a compression unit or decompression unit). The first N samples are extracted by an extractor 510. It should be appreciated that the rest of the samples are identical to the first N samples due to the FFT property and may be ignored.

Figure 6:
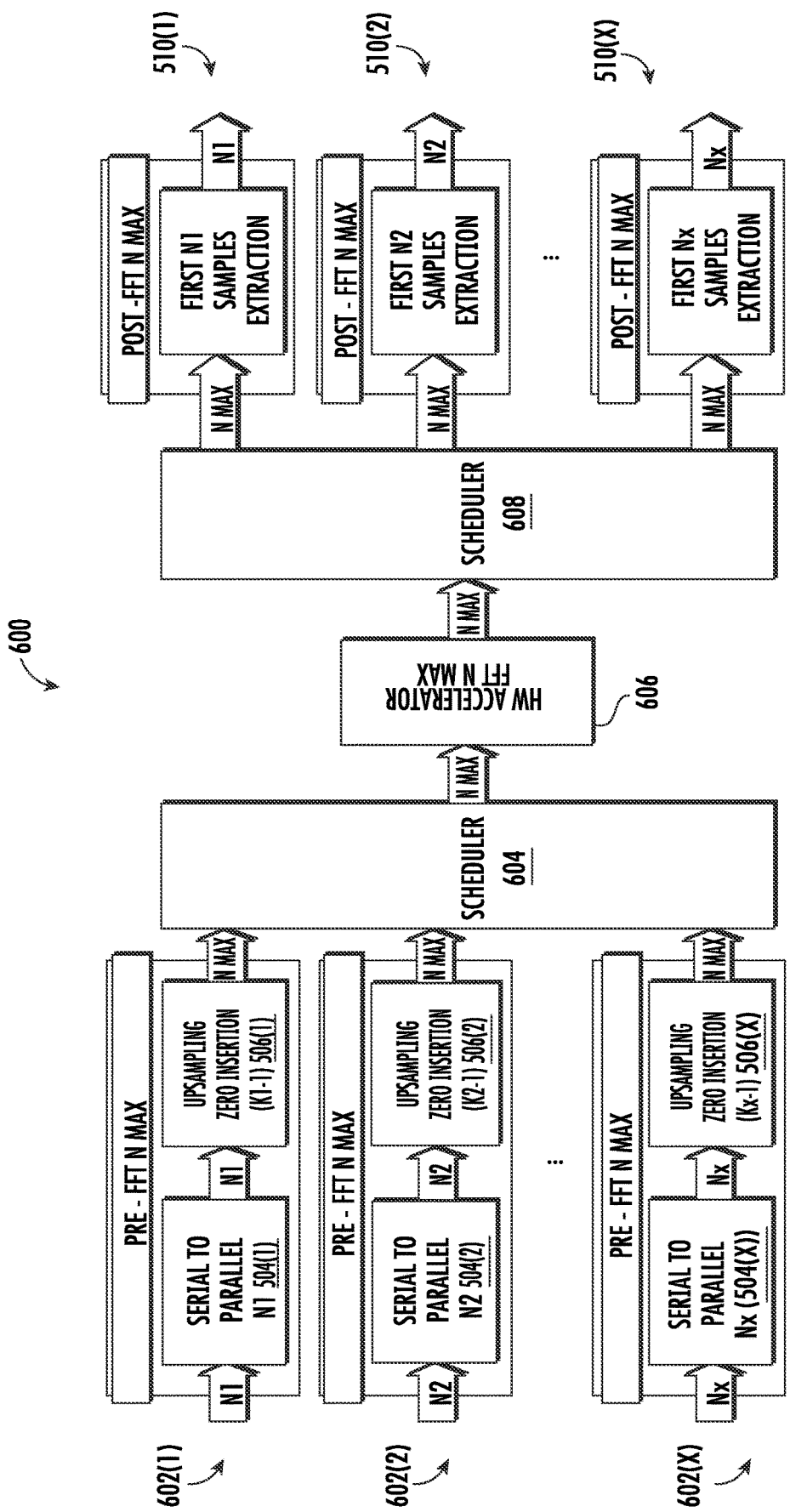
FIG. 6 is a block diagram of an expanded FFT unit accommodating multiple channels concurrently.

The concepts of the FFT unit 500 may be extended to multiple channels through a scheduler as better illustrated in FIG. 6. Each channel of the FFT unit 600 may have its own preprocessing chain 602(1)-602(X) including a respective serial-to-parallel converter 504(1)-504(X) and upsampling unit 506(1)-506(X). A scheduler 604 is used to schedule use of the FFT operation 606. Note that different delays between high and low frequency sampled signals may also be resolved by scheduling low sampling frequency channels first, such that the last sample in a block is available earlier than for a high sampling frequency channel, and then both channels may be transported simultaneously with the latency imposed by waiting for the high sampling frequency channel being less than the latency would have been for waiting for the low sampling frequency channel. A second scheduler 608 is used to separate the channels to provide post transformation processing by respective extractors 510(1)-510(X).

Figure 7:
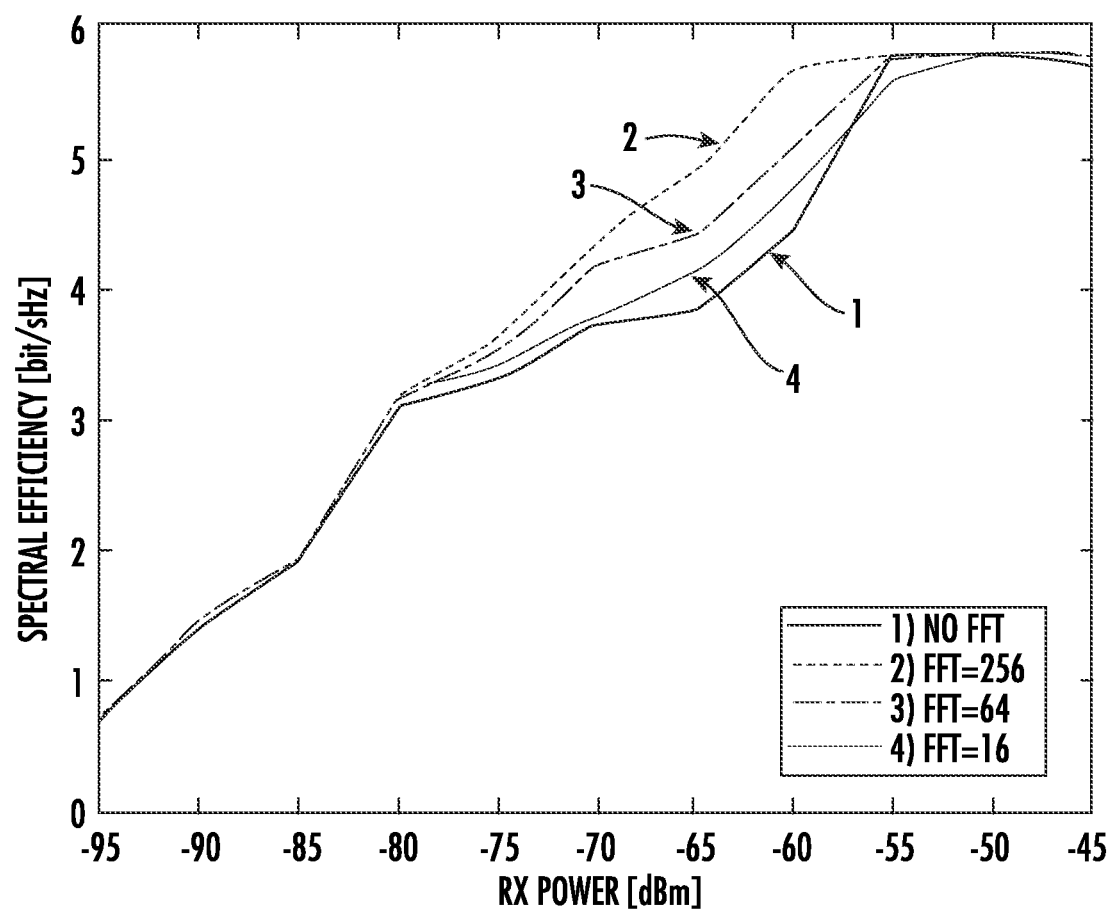
FIG. 7 is a graph of spectral efficiency versus received power for a signal using variable-sized FFT units.

FIG. 7 shows an exemplary comparison of spectral efficiencies for differing received power signals using differently-sized FFT units. Over the power range of interest, −75 dB to −55 dB, it is readily apparent that differently-sized FFT units will have a different efficiency and may be selected accordingly.

FIG. 8 provides a more quantified table of channel bandwidth versus latency for a given FFT block size. These values are exemplary, but supported by initial test data.

Figure 9:
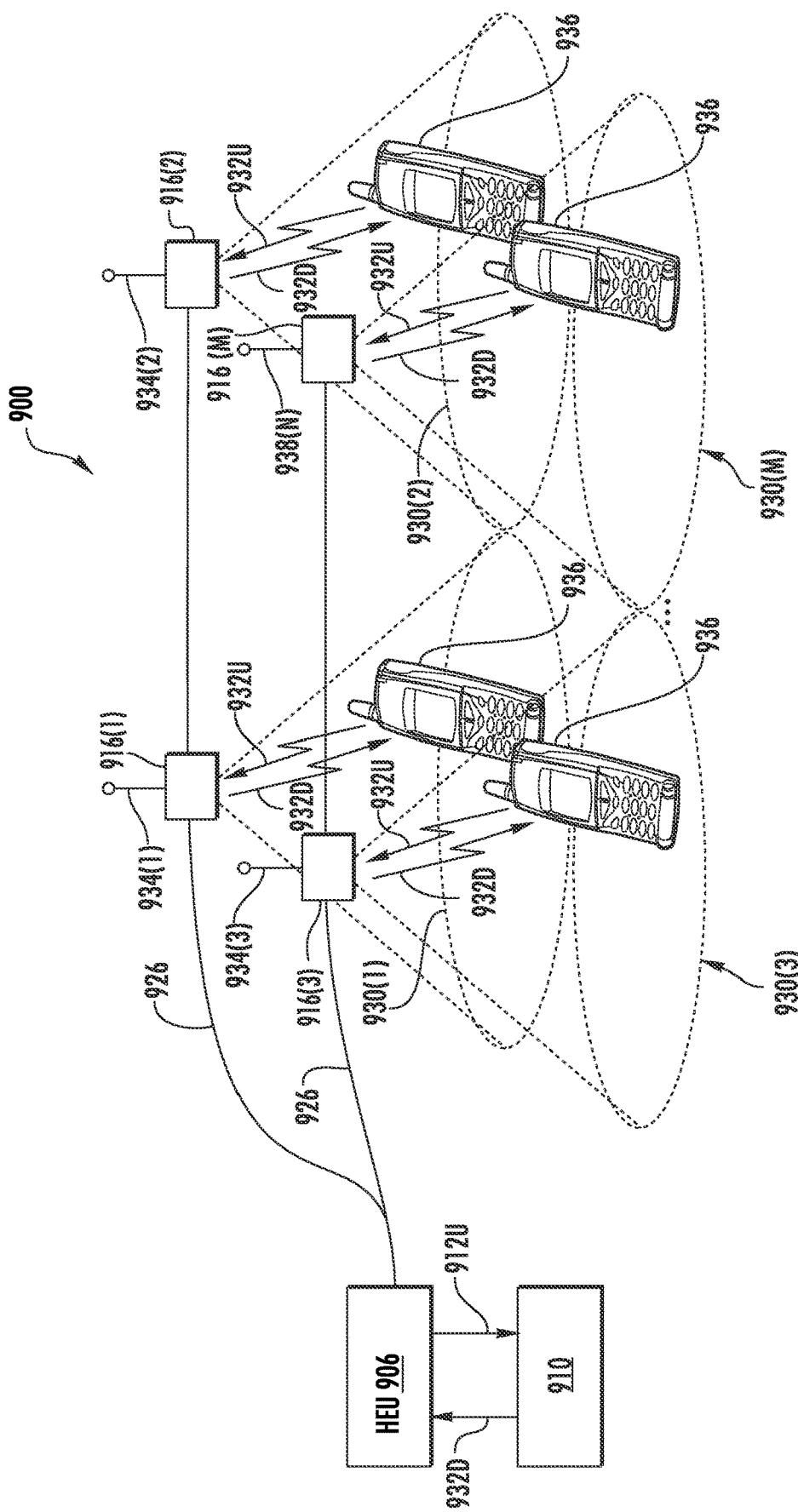
FIG. 9 is a block diagram of the WCS of FIG. 1 implementing the variable-size FFT units and IFFT units of the present disclosure within central units and remote units.
Figure 10:
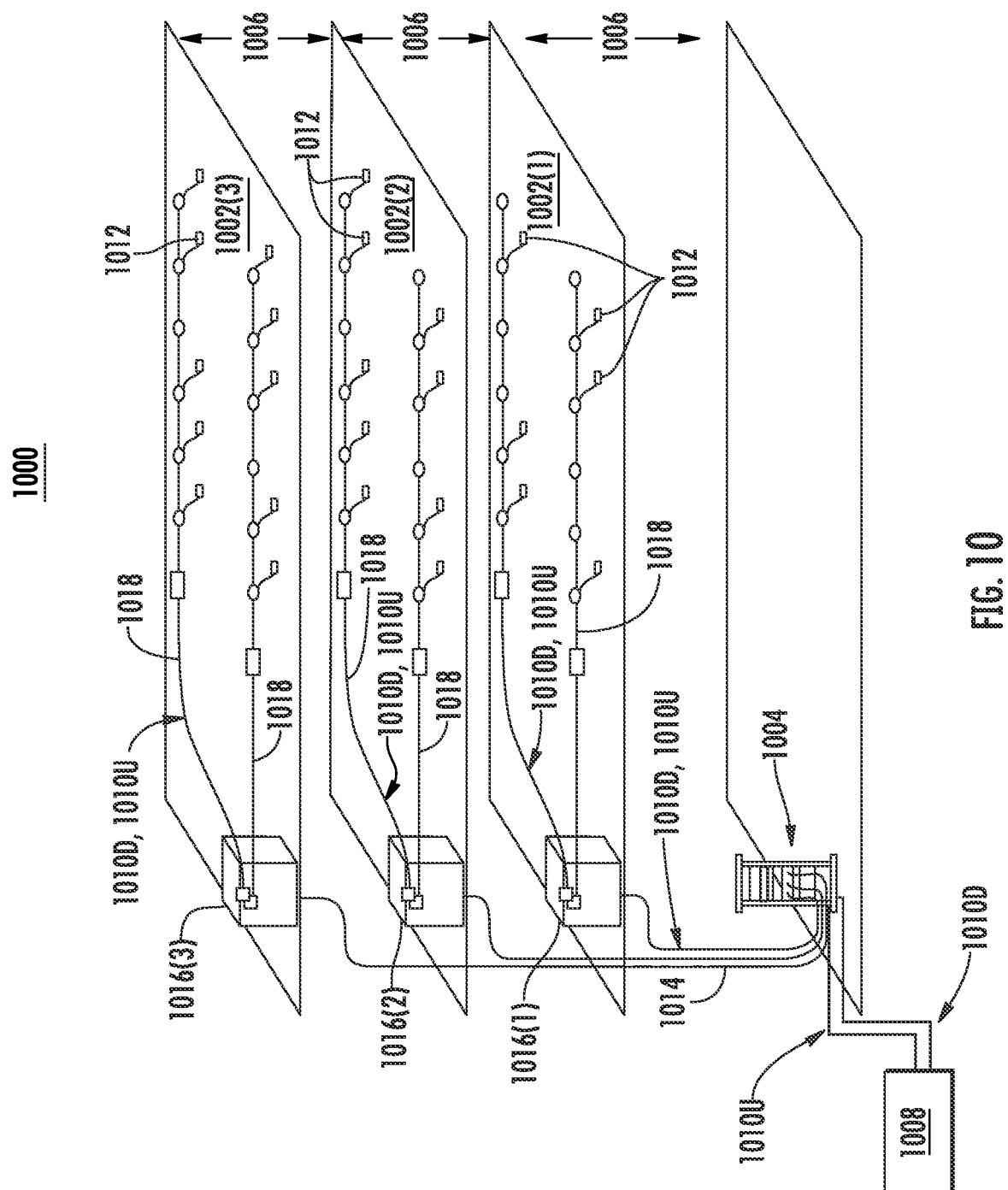
FIG. 10 is a partial schematic cut-away diagram of an exemplary building infrastructure in a WCS, such as the WCS of FIG. 1.
Figure 11:
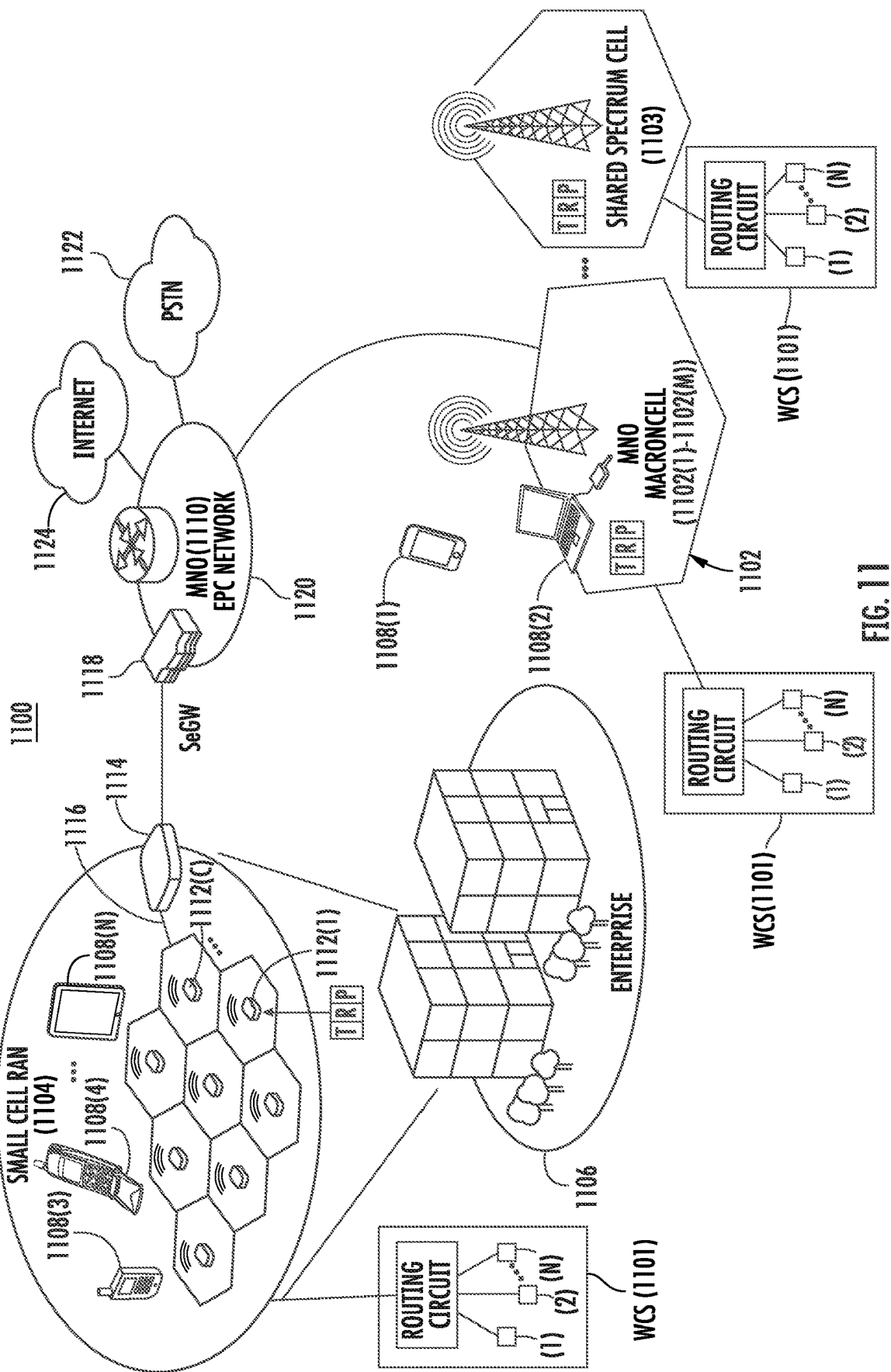
FIG. 11 is a schematic diagram of an exemplary mobile telecommunications environment that can includes the WCS of FIG. 1.

In the interests of completeness, exemplary WCS such as a DAS are illustrated in FIGS. 9-11. It should be appreciated that the variably-sized FFT operations of the present disclosure may be used between head end units and remote units of such WCS. In particular, FIG. 9 illustrates a DAS 900 in operation and configured to distribute communication services to remote coverage areas 930(1)-930(M). The DAS 900 can be configured to support a variety of communication services that can include cellular communication services, wireless communication services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 930(1)-930(M) are created by and centered on the RUs 916(1)-916(M) connected to a central unit, which may be the head end unit 906. The head end unit 906 may be communicatively coupled to a component of an RF service 910, such as for example, a base transceiver station (BTS) or a baseband unit (BBU). In this regard, the head end unit 906 receives downlink communication signals 932D from the RF service 910 to be distributed to the RUs 916(1)-916(M). The downlink communication signals 932D can include data communication signals and/or communication signaling signals, as examples. The head end unit 906 may be configured with filtering circuits and/or other signal processing circuits that are configured to support a specific number of communication services in a particular frequency bandwidth (i.e., frequency communication bands). The downlink communication signals 932D are communicated by the head end unit 906 over the OIU 926 to the RUs 116(1)-916(M).

With continuing reference to FIG. 9, the RUs 916(1)-916(M) are configured to receive the downlink communication signals 932D from the head end unit 906 over the OIU 926. The downlink communication signals 932D are configured to be distributed to the respective remote coverage areas 930(1)-930(M) of the RUs 916(1)-916(M). The RUs 916(1)-916(M) are also configured with filters and other signal processing circuits that are configured to support all or a subset of the specific communication services (i.e., frequency communication bands) supported by the head end unit 906. Each of the RUs 916(1)-916(M) may include an RF transmitter/receiver (not shown explicitly) and a respective antenna 934(1)-934(M) operably connected to the RF transmitter/receiver to distribute wirelessly the communication services to user equipment (UE) 936 within the respective remote coverage areas 930(1)-930(M). The RUs 916(1)-916(M) are also configured to receive uplink communication signals 932U from the UE 936 in the respective remote coverage areas 930(1)-930(M) to be distributed to the RF service 910.

FIG. 10 is a partial schematic cut-away diagram of an exemplary building infrastructure 1000 in a WCS, such as the WCS 100 of FIG. 1. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of RUs 1012 (e.g., RUs 206(1)-206(N)) to distribute the downlink communications signals 1010D to the RUs 1012 and to receive uplink communications signals 1010U from the RUs 1012, as previously discussed above. The downlink communications signals 1010D and the uplink communications signals 1010U communicated between the central unit 1004 and the RUs 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the RUs 1012 and also provide power to the RUs 1012 via array cables 1018.

The WCS 100 of FIG. 1 can also be interfaced with different types of radio nodes of service providers and/or supporting service providers, including macrocell systems, small cell systems, and remote radio heads (RRH) systems, as examples. For example, FIG. 11 is a schematic diagram of an exemplary mobile telecommunications environment 1100 (also referred to as "environment 1100") that includes radio nodes and cells that may support shared spectrum, such as unlicensed spectrum, and can be interfaced to shared spectrum WCSs 1101 supporting coordination of distribution of shared spectrum from multiple service providers to remote units to be distributed to subscriber devices. The shared spectrum WCSs 1101 can include the WCS 100 of FIG. 1.

The environment 1100 includes exemplary macrocell RANs 1102(1)-1102(M) ("macrocells 1102(1)-1102(M)") and an exemplary small cell RAN 1104 located within an enterprise environment 1106 and configured to service mobile communications between a user mobile communications device 1108(1)-1108(N) to a mobile network operator (MNO) 1110. A serving RAN for the user mobile communications devices 1108(1)-1108(N) is a RAN or cell in the RAN in which the user mobile communications devices 1108(1)-1108(N) have an established communications session with the exchange of mobile communications signals for mobile communications. Thus, a serving RAN may also be referred to herein as a serving cell. For example, the user mobile communications devices 1108(3)-1108(N) in FIG. 11 are being serviced by the small cell RAN 1104, whereas the user mobile communications devices 1108(1) and 1108(2) are being serviced by the macrocell 1102. The macrocell 1102 is an MNO macrocell in this example. However, a shared spectrum RAN 1103 (also referred to as "shared spectrum cell 1103") includes a macrocell in this example and supports communications on frequencies that are not solely licensed to a particular MNO, such as CBRS for example, and thus may service user mobile communications devices 1108(1)-1108(N) independent of a particular MNO. For example, the shared spectrum cell 1103 may be operated by a third party that is not an MNO and wherein the shared spectrum cell 1103 supports CBRS. Also, as shown in FIG. 11, the MNO macrocell 1102, the shared spectrum cell 1103, and/or the small cell RAN 1104 can interface with a shared spectrum WCS 1101 supporting coordination of distribution of shared spectrum from multiple service providers to remote units to be distributed to subscriber devices. The MNO macrocell 1102, the shared spectrum cell 1103, and the small cell RAN 1104 may be neighboring radio access systems to each other, meaning that some or all can be in proximity to each other such that a user mobile communications device 1108(3)-1108(N) may be able to be in communications range of two or more of the MNO macrocell 1102, the shared spectrum cell 1103, and the small cell RAN 1104 depending on the location of the user mobile communications devices 1108(3)-1108(N).

In FIG. 11, the mobile telecommunications environment 1100 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1100 includes the enterprise environment 1106 in which the small cell RAN 1104 is implemented. The small cell RAN 1104 includes a plurality of small cell radio nodes 1112(1)-1112(C). Each small cell radio node 1112(1)-1112(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 11, the small cell RAN 1104 includes one or more services nodes (represented as a single services node 1114) that manage and control the small cell radio nodes 1112(1)-1112(C). In alternative implementations, the management and control functionality may be incorporated into a radio node, distributed among nodes, or implemented remotely (i.e., using infrastructure external to the small cell RAN 1104). The small cell radio nodes 1112(1)-1112(C) are coupled to the services node 1114 over a direct or local area network (LAN) connection 1116 as an example, typically using secure IPsec tunnels. The small cell radio nodes 1112(1)-1112(C) can include multi-operator radio nodes. The services node 1114 aggregates voice and data traffic from the small cell radio nodes 1112(1)-1112(C) and provides connectivity over an IPsec tunnel to a security gateway (SeGW) 1118 in a network 1120 (e.g., evolved packet core (EPC) network in a 4G network, or 5G Core in a 5G network) of the MNO 1110. The network 1120 is typically configured to communicate with a public switched telephone network (PSTN) 1122 to carry circuit-switched traffic, as well as for communicating with an external packet-switched network such as the Internet 1124.

The environment 1100 also generally includes a node (e.g., eNodeB or gNodeB) base station, or "macrocell" 1102. The radio coverage area of the macrocell 1102 is typically much larger than that of a small cell where the extent of coverage often depends on the base station configuration and surrounding geography. Thus, a given user mobile communications device 1108(3)-1108(N) may achieve connectivity to the network 1120 (e.g., EPC network in a 4G network, or 5G Core in a 5G network) through either a macrocell 1102 or small cell radio node 1112(1)-1112(C) in the small cell RAN 1104 in the environment 1100.

Figure 12:
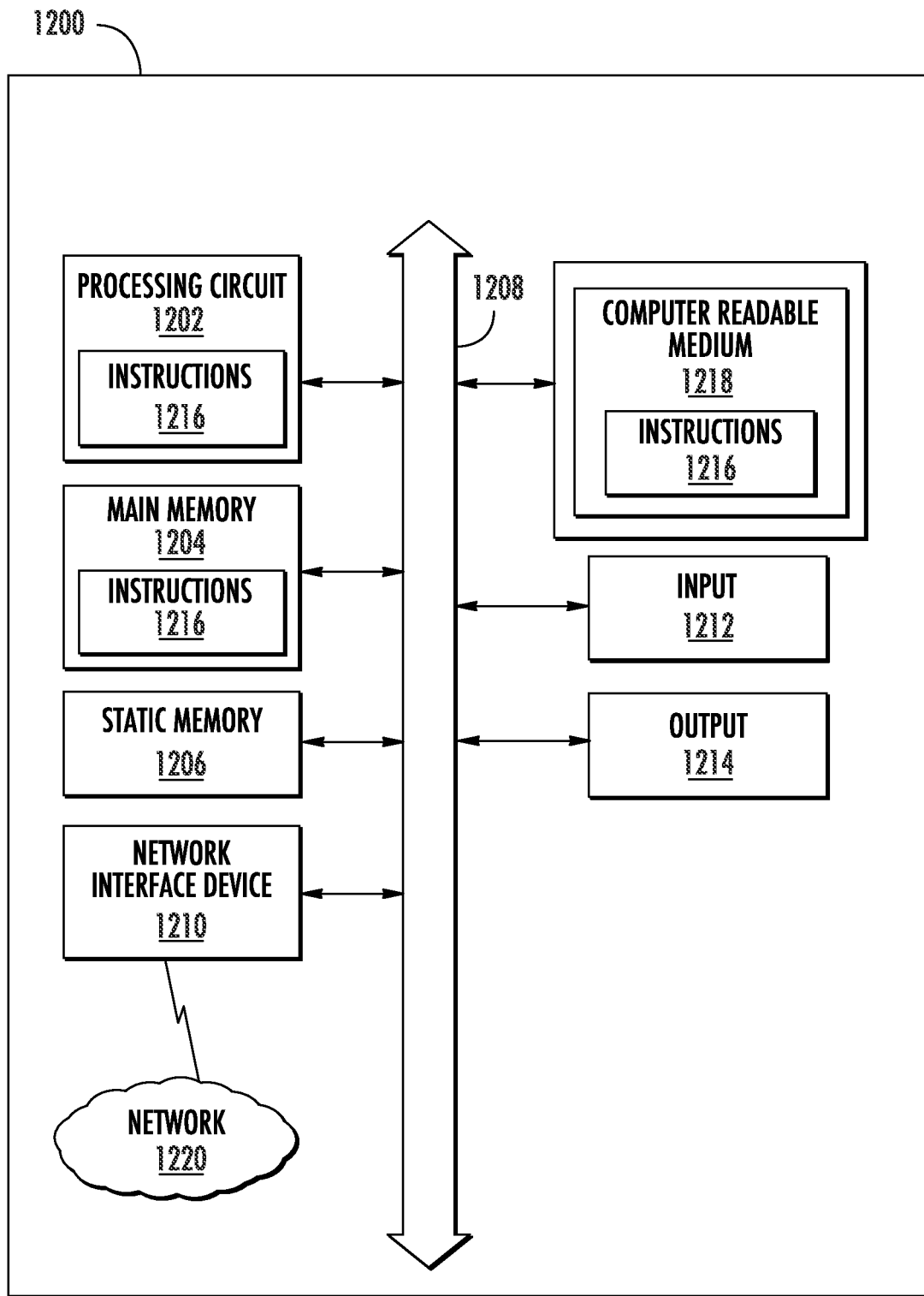
FIG. 12 is a schematic diagram of a representation of an exemplary computer system that can be included in or interfaced with any of the components in the WCS of FIG. 1, wherein the exemplary computer system is configured to execute instructions from an exemplary computer-readable medium.

Any of the circuits in the WCS 100 of FIG. 1 such as the DRU, BBU, RU, or the like, can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting the computer-readable medium 1218. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A device comprising:
   an input configured to receive a signal from a remote source, wherein the input is configured to receive a plurality of input signals in a corresponding plurality of channels;
   a compression unit coupled to the input, the compression unit comprising:
   a size calculator unit configured to evaluate channel requirements to determine a fast Fourier transform (FFT) block size, wherein the size calculator unit comprises a look-up table that compares the channel requirements to channel information to determine the FFT block size;
   a variable-sized FFT unit coupled to the size calculator unit and configured to:
   receive digital samples based on the signal; and
   perform an FFT operation thereon to produce a transformed signal; and
   a transformed signal compression unit coupled to the variable-sized FFT unit and configured to apply a compression algorithm on the transformed signal to produce a compressed signal; and a fronthaul interface coupled to the compression unit and configured to:
   receive the compressed signal;
   couple to a transport medium; and
   send the compressed signal over the transport medium.

2. The device of claim 1, wherein the device comprises a head end unit.

3. The device of claim 2, wherein the input configured to receive the signal from the remote source is configured to receive the signal from a base station.

4. The device of claim 1, wherein the compression unit comprises a hardware circuit.

5. The device of claim 1, wherein the compression unit comprises a control circuit with software.

6. The device of claim 1, wherein the device comprises a remote unit.

7. The device of claim 6, wherein the input comprises an antenna configured to receive a radio frequency (RF) signal from a wireless communication device.

8. The device of claim 1, wherein the input is configured to receive a plurality of input signals in a corresponding plurality of channels.

9. The device of claim 8, wherein the compression unit further comprises a scheduler configured to process the plurality of channels.

10. The device of claim 1, wherein the size calculator unit is configured to receive common public radio interface (CPRI) channel information and derive the channel requirements therefrom.

11. The device of claim 1, wherein at least one channel requirement comprises latency.

12. The device of claim 11, wherein at least a second channel requirement comprises bandwidth.

13. The device of claim 1, wherein the variable-sized FFT unit comprises an upsampling unit configured to insert zeros into a sample before performing an FFT operation.

14. The device of claim 1, further comprising a switch and a bypass route configured to bypass selectively the variable-sized FFT unit.

15. The device of claim 1, further comprising:
   a second input configured to be coupled to the fronthaul interface; and
   a decompression unit configured to decompress signals received through the second input.

16. The device of claim 15, wherein the decompression unit comprises:
   a received signal decompression unit configured to produce a decompressed signal; and
   a variable-sized inverse FFT (IFFT) unit coupled to the received signal decompression unit and configured to:
      receive the decompressed signal; and
      perform an IFFT operation thereon.

17. The device of claim 15, wherein the decompression unit further comprises a decompression block size calculator.

18. A wireless communications system (WCS), comprising:
   a head end unit, wherein the head end unit comprises:
      an electrical-to-optical (E/O) converter configured to convert a plurality of downlink communications signals into a plurality of downlink optical communications signals, respectively; and
      an optical-to-electrical (O/E) converter configured to convert a plurality of uplink optical communications signals into a plurality of uplink communications signals, respectively; and
   a plurality of remote units each coupled to the head end unit via a transport medium, each remote unit of the plurality of remote units comprising:
      a respective O/E converter configured to convert a respective one of the plurality of downlink optical communications signals into a respective one of the plurality of downlink communications signals; and
      a respective E/O converter configured to convert a respective one of the plurality of uplink communications signals into a respective one of the plurality of uplink optical communications signals;
   wherein the head end unit comprises a compression unit, the compression unit comprising:
      a size calculator unit configured to evaluate channel requirements to determine a fast Fourier transform (FFT) block size;
      a variable-sized FFT unit coupled to the size calculator unit and configured to:
         perform an FFT operation on digital samples to produce a transformed signal; and
      a transformed signal compression unit coupled to the variable-sized FFT unit and configured to apply a compression algorithm on the transformed signal to produce a compressed signal; and
      a fronthaul interface coupled to the compression unit and configured to:
         receive the compressed signal;
         couple to the transport medium; and
         send the compressed signal over the transport medium.

19. The WCS of claim 18, wherein a remote unit comprises a decompression unit.

20. The WCS of claim 18, wherein a remote unit comprises a second compression unit.

* * * * *